United States Patent
Li (10) Patent No.: US 9,408,239 B2
(45) Date of Patent: Aug. 2, 2016

(54) INTEGRATED EMERGENCY CALL SUPPORT FOR MOBILE AND NOMADIC DEVICES

(71) Applicant: Verizon Patent and Licensing Inc., Arlington, VA (US)

(72) Inventor: Mingxing S. Li, San Jose, CA (US)

(73) Assignee: Verizon Patent and Licensing Inc., Bsking Ridge, NJ (US)

( * ) Notice: Subject to any disclaimer, the term of this patent is extended or adjusted under 35 U.S.C. 154(b) by 102 days.

(21) Appl. No.: 14/293,048

(22) Filed: Jun. 2, 2014

(65) Prior Publication Data

US 2014/0273919 A1  Sep. 18, 2014

Related U.S. Application Data

(62) Division of application No. 13/191,691, filed on Jul. 27, 2011, now Pat. No. 8,761,721.

(51) Int. Cl.
| H04M 11/04 | (2006.01) |
| H04W 76/00 | (2009.01) |
| H04W 4/22 | (2009.01) |
| H04W 4/02 | (2009.01) |

(52) U.S. Cl.
CPC ............. *H04W 76/007* (2013.01); *H04W 4/02* (2013.01); *H04W 4/021* (2013.01); *H04W 4/22* (2013.01)

(58) Field of Classification Search
CPC ......... H04W 4/02; H04W 4/22; H04W 4/021; H04W 76/007
USPC ......... 455/404.1–404.2, 456.1–456.6; 379/45
See application file for complete search history.

(56) References Cited

U.S. PATENT DOCUMENTS

| 2008/0153455 A1* | 6/2008 | Lancaster | 455/405 |
| 2009/0311987 A1 | 12/2009 | Edge et al. | |
| 2010/0003954 A1 | 1/2010 | Greene et al. | |
| 2010/0105353 A1* | 4/2010 | Cacioppo et al. | 455/404.2 |
| 2011/0211440 A1 | 9/2011 | Arsenault et al. | |
| 2012/0243466 A1 | 9/2012 | Hagens et al. | |

* cited by examiner

*Primary Examiner* — Wayne Cai (57) ABSTRACT

A device receives an emergency call via a session initiation protocol (SIP) invite that includes a cell identification (ID) and a service or device type associated with a user equipment (UE). The device determines, based on the service or device type, whether the UE is a fixed device or a wireless device, and uses a static approach to route the emergency call to a public safety answering point (PSAP) when the UE is a fixed device. The device uses a cell database to route the emergency call to the PSAP, based on the cell ID, when the UE is a wireless device.

20 Claims, 6 Drawing Sheets

INTEGRATED EMERGENCY CALL SUPPORT FOR MOBILE AND NOMADIC DEVICES

CROSS REFERENCE TO RELATED APPLICATIONS

This application is a divisional of U.S. patent application Ser. No. 13/191,691 filed on Jul. 27, 2011, the disclosure of which is hereby incorporated herein by reference.

BACKGROUND

To support voice over Internet protocol (VoIP) over a network (e.g., a Long Term Evolution (LTE) network, an evolved high rate packet data (eHRPD) network, mixed LTE/eHRPD networks, etc.), enhanced emergency calls (or "E911" calls) must be supported. A caller placing the E911 call may be connected to the network via user equipment (UE), such as a mobile communication device, a cell phone, a mobile terminal, a smart phone, a personal digital assistant (PDA), etc. The network-based VoIP must provide the caller's initial and updated cell/sector locations to a correct public safety answering point (PSAP). There are different ways of determining a location of a UE making an E911 call. For example, triangulation of received UE signals by multiple cell towers, with prior knowledge of the cell tower locations, may be used to determine the location of the UE. If the UE supports global positioning system (GPS) and GPS satellite signals can be received by the UE, the GPS location of the UE can be obtained, by a network location server, by using various protocols, such as the open mobile alliance (OMA) secure user plane location (SUPL) protocol, the LTE location positioning protocol (LPP), etc. The precise GPS location is provided to the PSAP when the PSAP queries for the GPS location after receiving the E911 call.

As fourth generation (4G) wireless technologies become available, mobile network service providers will replace fixed broadband connections, such as digital subscriber line (DSL) devices and cable modems, with wireless broadband devices that use the 4G wireless technologies. Such wireless broadband devices can be nomadic devices that may be relocated from one location to another location. For example, a customer may move a nomadic wireless broadband device from a primary residence to a secondary residence (e.g., a vacation home without a valid postal address). Furthermore, the nomadic wireless broadband devices may not be equipped with GPS functionality (e.g., via GPS chips) for cost reasons since they may not truly be mobile devices. Wireless service providers currently must support emergency calls for both mobile devices (e.g., with GPS chips) and nomadic devices (e.g., without GPS chips).

DETAILED DESCRIPTION OF PREFERRED EMBODIMENTS

The following detailed description refers to the accompanying drawings. The same reference numbers in different drawings may identify the same or similar elements.

Systems and/or methods described herein may provide integrated VoIP-based emergency call (e.g., E911 calls) support for mobile devices and nomadic devices. In one example implementation, the systems and/or methods may utilize VoIP over a LTE network to support E911 calls, but may also support E911 calls over eHRPD networks or a mixture of LTE and eHRPD networks. The systems and/or methods may provide an integrated approach that uses the same routing, emergency call delivery, and UE location delivery design for both mobile devices and nomadic devices. The integrated approach may simplify network implementation and maintenance, and may permit devices to be used where valid civic addresses are not available.

A "civic address" of a device may be closely related to a postal address associated with the device. The terms "civil address" or "jurisdictional address" may also be used instead of the term "civic address."

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

As used herein, the terms "caller" and/or "user" may be used interchangeably. Also, the terms "caller" and/or "user" are intended to be broadly interpreted to include a UE or a user of a UE.

Figure 1:
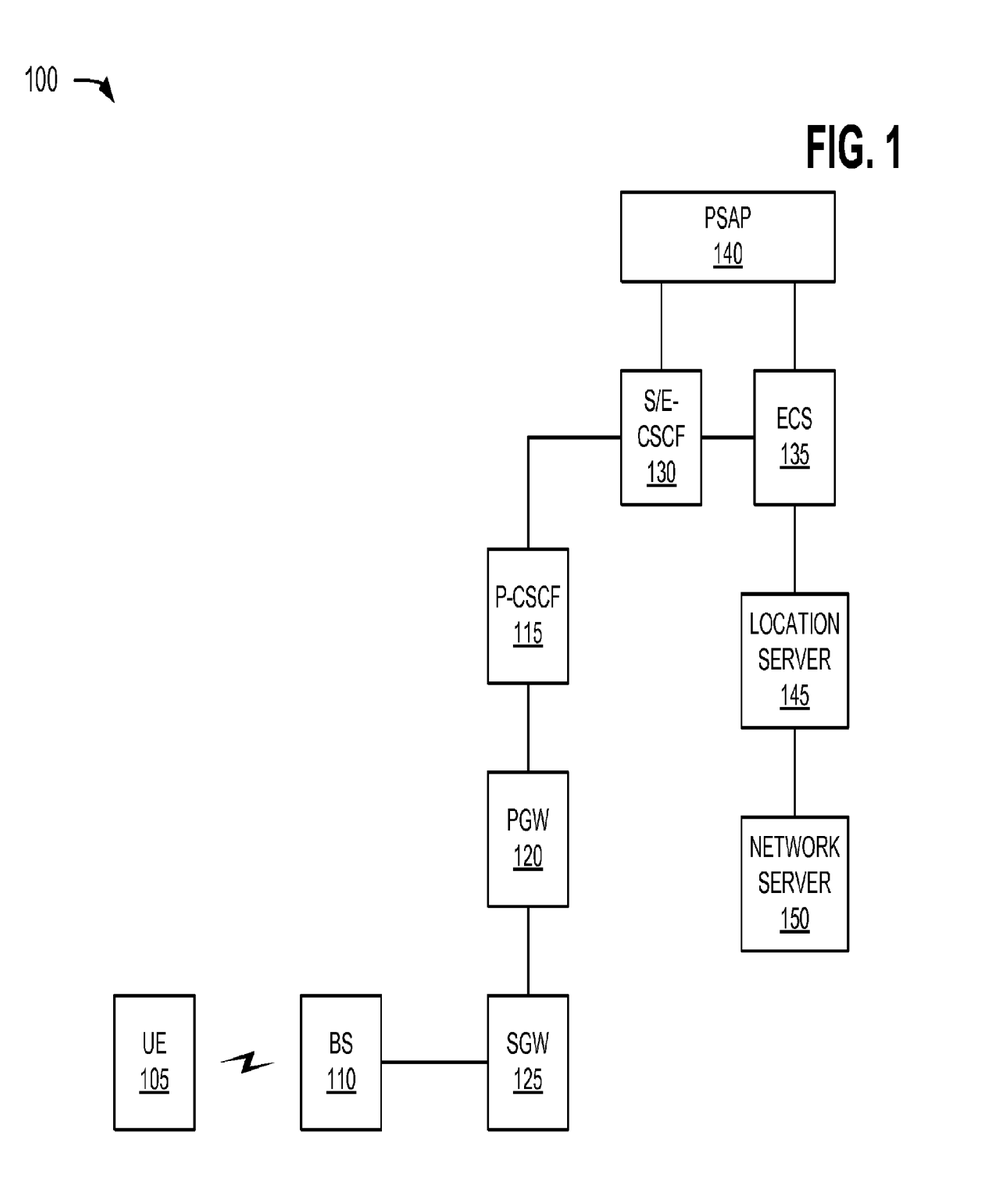
FIG. 1 is a diagram of an example network in which systems and/or methods described herein may be implemented.

FIG. 1 is a diagram of an example network 100 in which systems and/or methods described herein may be implemented. As illustrated, network 100 may include a UE 105, a base station (BS) 110, a proxy call session control function (P-CSCF) 115, a packet data network (PDN) gateway (PGW) 120, a serving gateway (SGW) 125, a serving or emergency CSCF (S/E-CSCF) 130, an emergency call server (ECS) 135, a PSAP 140, a location server 145, and a network server 150.

Components of network 100 may interconnect via wired and/or wireless connections or links. A single UE 105, BS 110, P-CSCF 115, PGW 120, SGW 125, S/E-CSCF 130, ECS 135, PSAP 140, location server 145, and network server 150 have been illustrated in FIG. 1 for simplicity. In practice, there may be more UEs 105, BSs 110, P-CSCFs 115, PGWs 120, SGWs 125, S/E-CSCFs 130, ECSs 135, PSAPs 140, location servers 145, and/or network servers 150. Also, in some instances, one or more of the components of network 100 may perform one or more functions described as being performed by another one or more of the components of network 100.

UE 105 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an example implementation, UE 105 may include a mobile communication device that is capable of supporting emergency services in a LTE-based network. In another implementation, UE 105 may include a nomadic wireless broadband device, such as an outdoor broadband unit that includes a LTE module capable of communicating with a wireless network. The outdoor broadband unit may also include a broadband home router (BHR) capable of communicating with a customer premises network. In still another implementation, UE 105 may include a LTE broadband modem that behaves like a DSL modem except that UE 105 connects to a network via LTE. The LTE modem may connect to a router or switch that connects to various devices (e.g., computers) located at a customer premises.

BS 110 may include one or more computation and/or communication devices that may receive voice and/or data from SGW 125 and may transmit that voice and/or data to UE 105 via an air interface. BS 110 may also receive voice and/or data from UE 105 over an air interface and may transmit that voice and/or data to SGW 125 or other UEs.

P-CSCF 115 may include one or more server devices, or other types of computation or communication devices, that gather, process, search, and/or provide information in a manner described herein. In an example implementation, P-CSCF 115 may function as a proxy server for UE 105, where session initiation protocol (SIP) signaling traffic to and from UE 105 may go through P-CSCF 115. P-CSCF 115 may validate and then forward requests from UE 105, and may process and forward responses to UE 105.

PGW 120 may include a traffic transfer device (or network device), such as a gateway, a router, a switch, a firewall, a network interface card (NIC), a hub, a bridge, a proxy server, an optical add-drop multiplexer (OADM), or some other type of device that processes and/or transfers traffic. In an example implementation, PGW 120 may terminate towards a packet data network. PGW 120 may perform policy enforcement, per-user based packet filtering (e.g., by deep packet inspection), charging support, lawful interception, UE 105 IP address allocation, packet screening, etc.

SGW 125 may include a traffic transfer device (or network device), such as a gateway, a router, a switch, a firewall, a NIC, a hub, a bridge, a proxy server, an OADM, or some other type of device that processes and/or transfers traffic. In an example implementation, SGW 125 may control and manage one or more base stations (e.g., BS 110), and may perform data processing to manage utilization of radio network services. SGW 125 may transmit/receive voice and data to/from BS 110, other SGWs, and/or PGW 120. SGW 125 may provide a local anchor point for inter-base station handover, and may provide IP routing and forwarding functions.

S/E-CSCF 130 may include one or more server devices, or other types of computation or communication devices, that gather, process, search, and/or provide information in a manner described herein. In an example implementation, S/E-CSCF 130 may be a central node of the signaling plane, and may perform session control. S/E-CSCF 130 may handle SIP registrations, may inspect signaling messages, may decide to which device(s) a SIP message may be forwarded, may provide routing services, etc.

ECS 135 may include one or more server devices, or other types of computation or communication devices, that gather, process, search, and/or provide information in a manner described herein. In an example implementation, ECS 135 may receive, from S/E-CSCF 130 an E911 call via a SIP INVITE that includes a cell identification (ID)/sector ID and a service or device type associated with UE 105; and may determine whether UE 105 is a fixed device or a wireless device. If UE 105 is a fixed device, ECS 135, in one example, may use a static approach to route the E911 call to PSAP 140. The static approach may include a wireline VoIP model where UE 105 registers a civic address with location server 145 and network 100 follows a model (e.g., the National Emergency Number Association (NENA) Interim VoIP Architecture (i2) model) to send the E911 call directly to PSAP 140. The NENA i2 model may include a wireline model that routes an E911 call to PSAP 140 based on the registered civic address.

In one example implementation, if UE 105 is a fixed device or a wireless device, ECS 135 may use a database of cell IDs to determine a PSAP for the E911 call based on the cell ID provided in the SIP INVITE. Thus, ECS 135 may handle both fixed devices and wireless devices in the same way, but how location information of UE 105 is stored in location server 145 may be different for wireless devices and fixed devices. For wireless devices, location server 145 may dynamically obtain a GPS location of UE 105. For fixed devices, a GPS location of UE may be provisioned in location server 145 by a service provider or a subscriber during service activation or when the location changes, or may be derived from a provisioned civic address. ECS 135 may route the E911 call to the determined PSAP (e.g., PSAP 140). ECS 135 may allocate an emergency service routing key (ESRK) to a message based on the determined PSAP, and may provide, to S/E-CSCF 130, the message with the ESRK. ECS 135 may provide, to location server 145, a first query for a GPS location of UE 105, and may receive, based on the first query, the GPS location of UE 105 from location server 145. ECS 135 may store the GPS location of UE 105. ECS 135 may receive, from PSAP 140, a second query for the GPS location of UE 105, and may provide, based on the second query, the GPS location of UE 105 (e.g., stored in ECS 135) to PSAP 140.

PSAP 140 may include one or more server devices, or other types of computation or communication devices, that gather, process, search, and/or provide information in a manner described herein. In an example implementation, PSAP 140 may be responsible for answering emergency calls provided via UE 105 (e.g., via BS 110). PSAP 140 may communicate with emergency personnel (e.g., police, fire, and/or ambulance services) (not shown) to provide information associated with emergency calls.

Location server 145 may include one or more server devices, or other types of computation or communication devices, that gather, process, search, and/or provide information in a manner described herein. In an example implementation, location server 145 may provide a secure user plane location (SUPL) platform (or other similar platforms) that may interact with UE 105 (or network platforms) to obtain a location (e.g., GPS coordinates) associated with UE 105. In one example, location server 145 may include a location server for mobile devices or a Location Information Server (LIS) used in the i2 model. In another example, location server 145 may include a first location server for mobile devices and a second location server for nomadic devices. In still another example, location server 145 may include a single location server for both mobile devices and nomadic devices.

In one example implementation, location server 145 may receive, from network server 150, address information associated with UE 105, such as a civic address and/or a GPS location of UE 105. If the civic address of UE 105 is not available, the GPS location of UE 105 may be provisioned to location server 145. If the GPS location of UE 105 is not available but the civic address is provisioned, location server 145 may perform a reverse geo-coding on the civic address to determine the GPS location of UE 105. Location server 145 may store the address information and the GPS location associated with UE 105 in a database associated with location server 145.

Location server 145 may receive, from ECS 135, a query with a service/device type of a UE (e.g., UE 105) placing an E911 call, and may determine whether UE 105 is a mobile device or a nomadic device. If UE 105 is a mobile device, location server 145 may determine the GPS location of UE 105 using a standard approach, such as using the SUPL and/or using a control plane solution (e.g., by querying a mobility management entity (MME), not shown). For example, in the standard approach, location server 145 may use a cell site of UE 105 to route an E911 call to PSAP 140, and the cell site and the GPS location of UE 105 may be provided to PSAP 140 when PSAP 140 queries.

If UE 105 is a nomadic device, location server 145 may retrieve the GPS location of UE 105 from the database, and may provide, to ECS 135, the GPS location of UE 105 in response to the query. ECS 135 may store the GPS location of UE 105 so that PSAP 140 may retrieve the GPS location of UE 105.

Network server 150 may include one or more server devices, or other types of computation or communication devices, that gather, process, search, and/or provide information in a manner described herein. In an example implementation, network server 150 may include one or more user databases that support network 100 entities that handle calls. The one or more databases of network server 150 may include subscription-related information (e.g., caller profiles). Network server 150 may perform authentication and authorization of a user, and may provide information about the user's (e.g., UE's 105) location and IP information. In one example implementation, network server 150 may be a web server, and a user or service provider may access (e.g., login to) the web server to provision the civic address and/or GPS location of UE 105. The user or service provider may access network server 150 via a computing device communicating with network server 150 and/or via an internal mechanism.

In one example, network 100 may implement a separate or overlay approach to handling E911 calls. In the separate approach, network 100 may handle E911 calls differently for mobile devices than nomadic devices. For mobile devices in the separate approach, network 100 may use a mobile device's cell site to route an E911 call to PSAP 140, and both the cell site and a GPS location of the mobile device may be sent to PSAP 140 when PSAP 140 provides a location query. For nomadic devices in the separate approach, a user of a nomadic device may register a civic address of the nomadic device with location server 145 (e.g., via network server 150), and network 100 may route an E911 call to PSAP 140 based on the registered civic address. Location server 145 may provide the registered civic address to PSAP 140 in response to a location query received from PSAP 140.

In one example implementation, network 100 may implement an integrated approach to handling E911 calls from both mobile devices and nomadic devices. For mobile devices in the integrated approach, network 100 may use a mobile device's cell site to route an E911 call to PSAP 140, and both the cell site and a GPS location of the mobile device may be sent to PSAP 140 when PSAP 140 provides a location query to location server 145. For nomadic devices in the integrated approach, a user (or a service provider) of a nomadic device may register a civic address and/or a GPS location of the nomadic device with location server 145 (e.g., via network server 150). Thus, location server 145 may store location information for both mobile devices and nomadic devices. Network 100 may route an E911 call from a nomadic device to PSAP 140, based on the cell location of the nomadic device, in the same way network 100 routes an E911 call for a mobile device. Location server 145 may provide the registered civic address and the GPS location to PSAP 140 in response to a location query received from PSAP 140.

Unlike the separate approach where a separate design and/or system may be used for nomadic devices and mobile devices, the integrated approach may use the same routing, call delivery, and location delivery design for both nomadic devices and mobile devices. Thus, the integrated approach may simplify network implementation and maintenance, and may permit broadband devices to be used where valid civic addresses are unavailable.

Although FIG. 1 shows example components of network 100, in other implementations, network 100 may contain fewer components, different components, differently arranged components, or additional components than depicted in FIG. 1.

Figure 2:
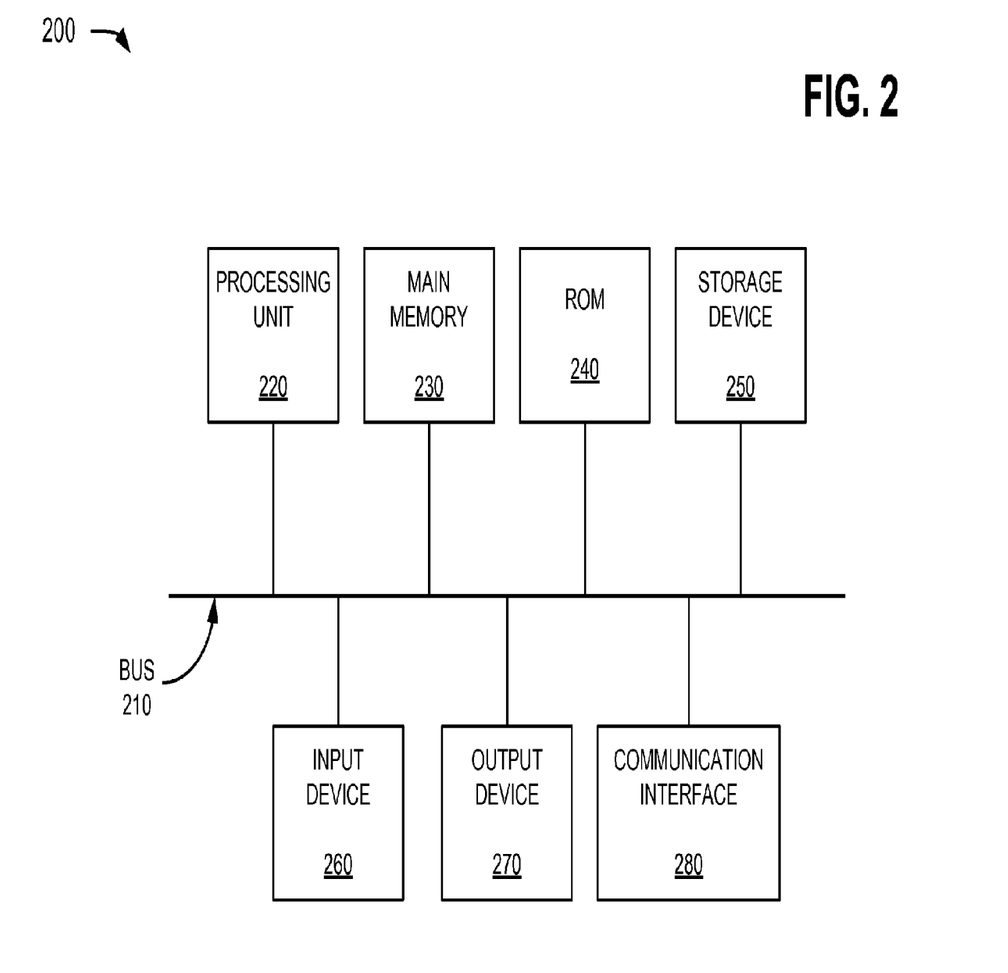
FIG. 2 is a diagram of example components of one or more devices of the network illustrated in FIG. 1.

FIG. 2 is a diagram of example components of a device 200 that may correspond to one or more devices of network 100. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
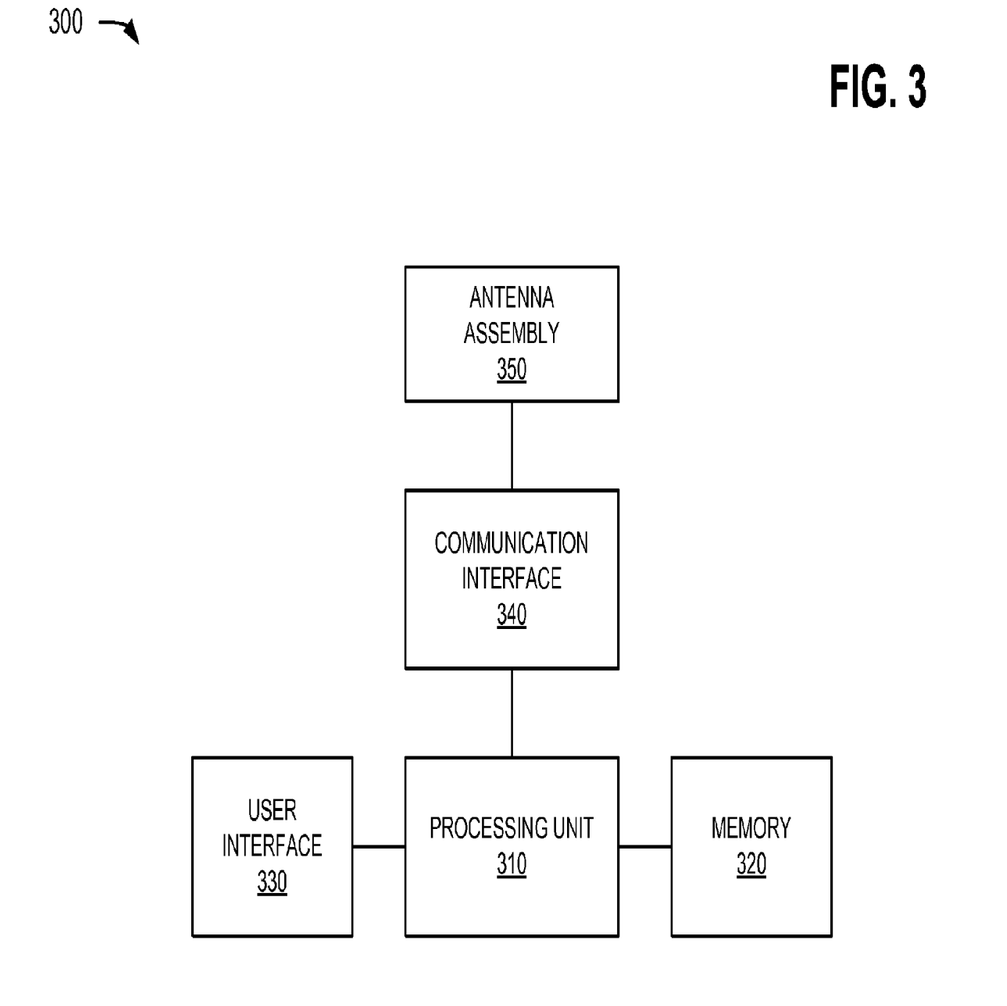
FIG. 3 is a diagram of example components of a user equipment of the network depicted in FIG. 1.

FIG. 3 depicts a diagram of example components of a device 300 that may correspond to, for example, UE 105. As illustrated, device 300 may include a processing unit 310, memory 320, a user interface 330, a communication interface 340, and/or an antenna assembly 350.

Processing unit 310 may include one or more processors, microprocessors, ASICs, FPGAs, or the like. Processing unit 310 may control operation of device 300 and its components. In one implementation, processing unit 310 may control operation of components of device 300 in a manner described herein.

Memory 320 may include a RAM, a ROM, and/or another type of memory to store data and instructions that may be used by processing unit 310.

User interface 330 may include mechanisms for inputting information to device 300 and/or for outputting information from device 300. Examples of input and output mechanisms might include buttons (e.g., control buttons, keys of a keypad, a joystick, etc.) or a touch screen interface to permit data and control commands to be input into device 300; a speaker to receive electrical signals and output audio signals; a microphone to receive audio signals and output electrical signals; a display to output visual information (e.g., text input into device 300); and/or a vibrator to causer equipment 300 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals.

Antenna assembly 350 may include one or more antennas to transmit and/or receive RF signals over the air. Antenna assembly 350 may, for example, receive RF signals from communication interface 340 and transmit them over the air, and receive RF signals over the air and provide them to communication interface 340. In one implementation, for example, communication interface 340 may communicate with a network and/or devices connected to a network.

As will be described in detail below, device 300 may perform certain operations described herein in response to processing unit 310 executing software instructions of an application contained in a computer-readable medium, such as memory 320. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
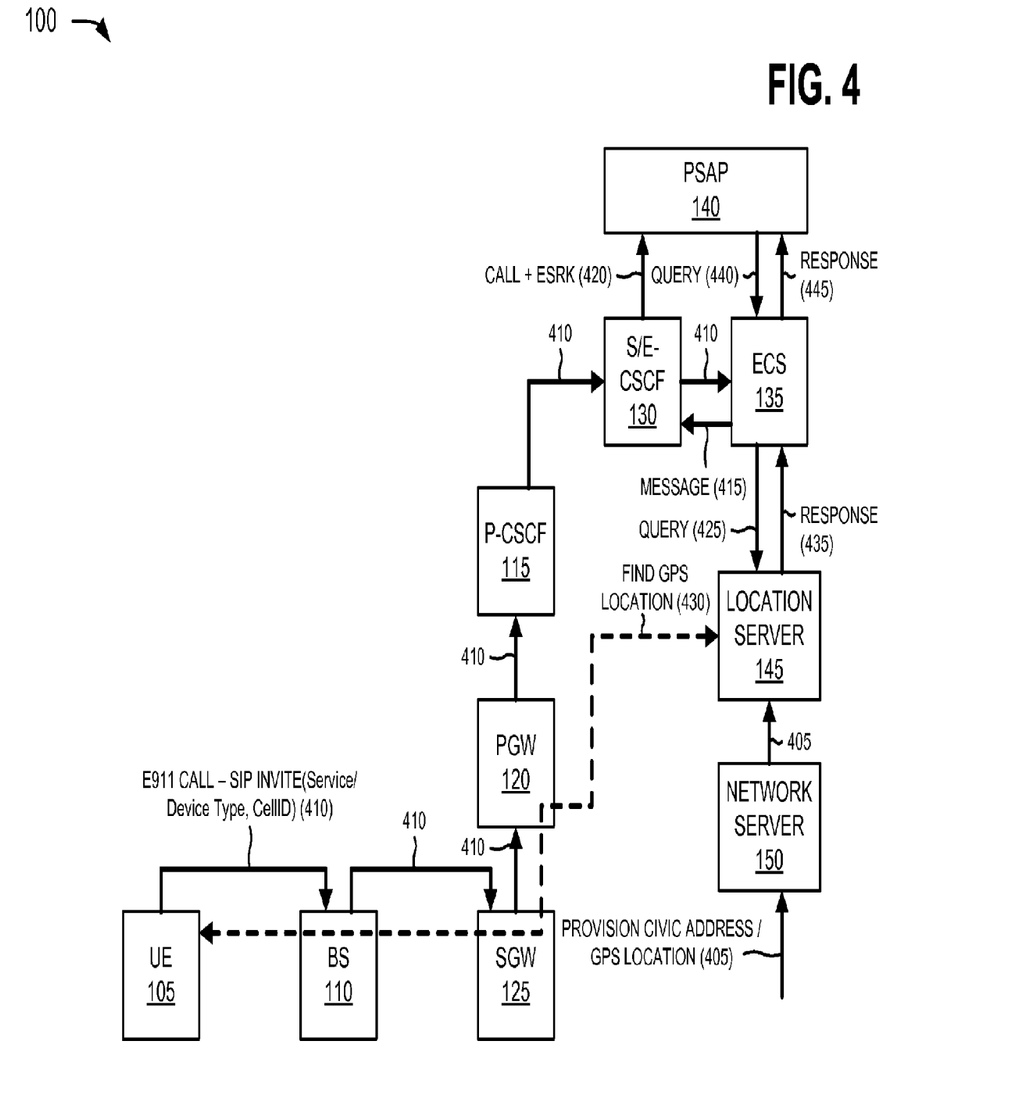
FIG. 4 is a diagram of example operations capable of being performed by an example portion of the network illustrated in FIG. 1.

FIG. 4 is a diagram of example operations capable of being performed by network 100. As shown in FIG. 4, network 100 may include UE 105, BS 110, P-CSCF 115, PGW 120, SGW 125, S/E-CSCF 130, ECS 135, PSAP 140, location server 145, and network server 150. UE 105, BS 110, P-CSCF 115, PGW 120, SGW 125, S/E-CSCF 130, ECS 135, PSAP 140, location server 145, and/or network server 150 may include the features described above in connection with one or more of, for example, FIGS. 1-3. In one implementation, FIG. 4 may depict operations associated with the integrated approach to handling E911 calls from both mobile devices and nomadic devices.

As further shown in FIG. 4, a user or service provider may provision address information, such as a civic address and/or a GPS location associated with UE 105, to network server 150, as indicated by reference number 405. In one example, the user or service provider may provision address information 405 to network server 150 by accessing network server 150 (e.g., via a login from an external device or via an internal mechanism) and providing address information 405 to network server 150. Network server 150 may provide address information 405 to location server 145, and location server 145 may store the civic address and/or the GPS location of UE 105 in a database associated with location server 145. If only the civic address is provided via address information 405, location server 145 may perform reverse geo-coding to determine the GPS location from the civic address. Location server 145 may store the determined GPS location in the database.

If a user of UE 105 makes an E911 call, UE 105 may generate a SIP INVITE 410 (e.g., for the E911 call) that includes a cell ID and an indication of a service or device type associated with UE 105. In one example, if UE 105 is a mobile device, SIP INVITE 410 may not include an indication of a service/device type. SIP INVITE 410 may also include a header indicating that the E911 call is different from normal mobile voice calls, information indicating whether UE 105 includes a GPS chipset, and/or other information. UE 105 may provide SIP INVITE 410 to BS 110, and BS 110 may forward SIP INVITE 410 to PGW 120 via SGW 115.

PGW 120 may provide SIP INVITE 410 to P-CSCF 115, and P-CSCF 115 may forward SIP INVITE 410 to S/E-CSCF 130. S/E-CSCF 130 may receive SIP INVITE 410, and may recognize the E911 call based on information contained in SIP INVITE 410. For example, S/E-CSCF 130 may recognize the E911 call based on the header indicating that the E911 call is different from normal mobile voice calls. S/E-CSCF 130 may route the E911 call based on the cell ID of UE 105 provided in SIP INVITE 410. For example, S/E-CSCF 130 may forward the E911 call (e.g., SIP INVITE 410) to ECS 135 based on the cell ID of UE 105.

ECS 135 may receive, from S/E-CSCF 130, the E911 call via SIP INVITE 410, and may determine whether UE 105 is a fixed device or a wireless device. If UE 105 is a fixed device, ECS 135, in one example, may use a static approach to route the E911 call to PSAP 140. The static approach may include a wireline VoIP model where UE 105 registers a civic address with location server 145 and network 100 follows a model (e.g., the NENA i2 model) to send the E911 call directly to PSAP 140. The NENA i2 model may include a wireline model that routes an E911 call to PSAP 140 based on the registered civic address.

In one example implementation, if UE 105 is fixed device or a wireless device, ECS 135 may use a cell database, such as a PSAP routing table (e.g., provided in ECS 135), to determine a PSAP (e.g., PSAP 140) to which to route the E911 call. For example, ECS 135 may compare the cell ID, provided in SIP INVITE 410, with the cell database to determine a PSAP to which to route the E911 call. Once the PSAP is determined, ECS 135 may allocate an ESRK (e.g., based on the determined PSAP) for S/E-CSCF 130 to use to route the E911 call to PSAP 140. The ESRK may also be used as a reference key by PSAP 140 to query ECS 135 for a GPS location of UE 105. ECS 135 may include the ESRK in a message 415 (e.g., a SIP "300" multiple choice message), and may provide message 415 to S/E-CSCF 130.

ECS 135 may handle both a fixed device UE 105 and a wireless device UE 105 in the same way. However, how location information of UE 105 is stored in location server 145 may be different for wireless devices and fixed devices. For a wireless device UE 105, location server 145 may dynamically obtain a GPS location of UE 105. For a fixed device UE 105, a GPS location of UE may be provisioned in location server 145 by a service provider or a subscriber during service activation or when the location changes, or may be derived from a provisioned civic address.

S/E-CSCF 130 may receive message 415, and may route the E911 call to PSAP 140 based on the ESRK provided in message 415, as indicated by reference number 420. ECS 135 may also provide, to location server 145, a query 425 for a GPS location of UE 105. Query 425 may include a service/device type associated UE 105 as well as other parameters. Location server 145 may receive query 425, and may determine whether UE 105 is a mobile device or a nomadic device based on the service/device type included in query 425. If UE 105 is a mobile device, location server 145 may begin a location session (e.g., based on query 425) to determine a GPS location of UE 105 using, for example, a LPP session over the SUPL platform (or other similar platforms), as indicated by reference number 430. A control plane solution may be used to determine the GPS location of UE 105 in addition to or as an alternative to using the SUPL platform. In one example, location server 145 may provide, to PGW 120, a query for the GPS location of UE 105. PGW 120 may provide the query to SGW 125, and SGW 125 may provide the query to UE 105, via BS 110. UE 105 may return a response that includes the GPS location of UE 105, and the response (e.g., with the GPS location) may be provided to location server 145, via BS 110, SGW 125, and PGW 120.

If UE 105 is a nomadic device, location server 145 may retrieve the GPS location of UE 105 from the database associated with location server 145. As described above, the GPS location of UE 105 may be pre-provisioned in the database by UE 105 and network server 150, as indicated by reference number 405. Upon determining the GPS location of UE 105 (e.g., via reference number 430 or from the database), location server 145 may provide a response 435 (e.g., in response to query 425) to ECS 135. Response 435 may include the GPS location of UE 105. ECS 135 may receive response 435 from location server 145, and may store the GPS location of UE 105 (e.g., contained in response 435) in a database associated with ECS 135.

Upon receiving the E911 call from S/E-CSCF 130, as indicated by reference number 420, PSAP 140 may generate a query 440 for the GPS location of UE 105 (e.g., using the ESRK as a query or reference key). PSAP 140 may provide query 440 to ECS 135, and ECS 135 may receive query 440. Based on query 440, ECS 135 may retrieve the GPS location of UE 105 from the database associated with ECS 135, and may generate a response 445 that includes the GPS location of UE 105. ECS 135 may provide response 445 to PSAP 140. PSAP 140 may utilize the GPS location of UE 105, provided in response 445, in order to provide emergency services to UE 105.

Although FIG. 4 shows example components of network 100, in other implementations, network 100 may include fewer components, different components, differently arranged components, or additional components than depicted in FIG. 4. Alternatively, or additionally, one or more components of network 100 may perform one or more other tasks described as being performed by one or more other components of network 100.

Figure 5:
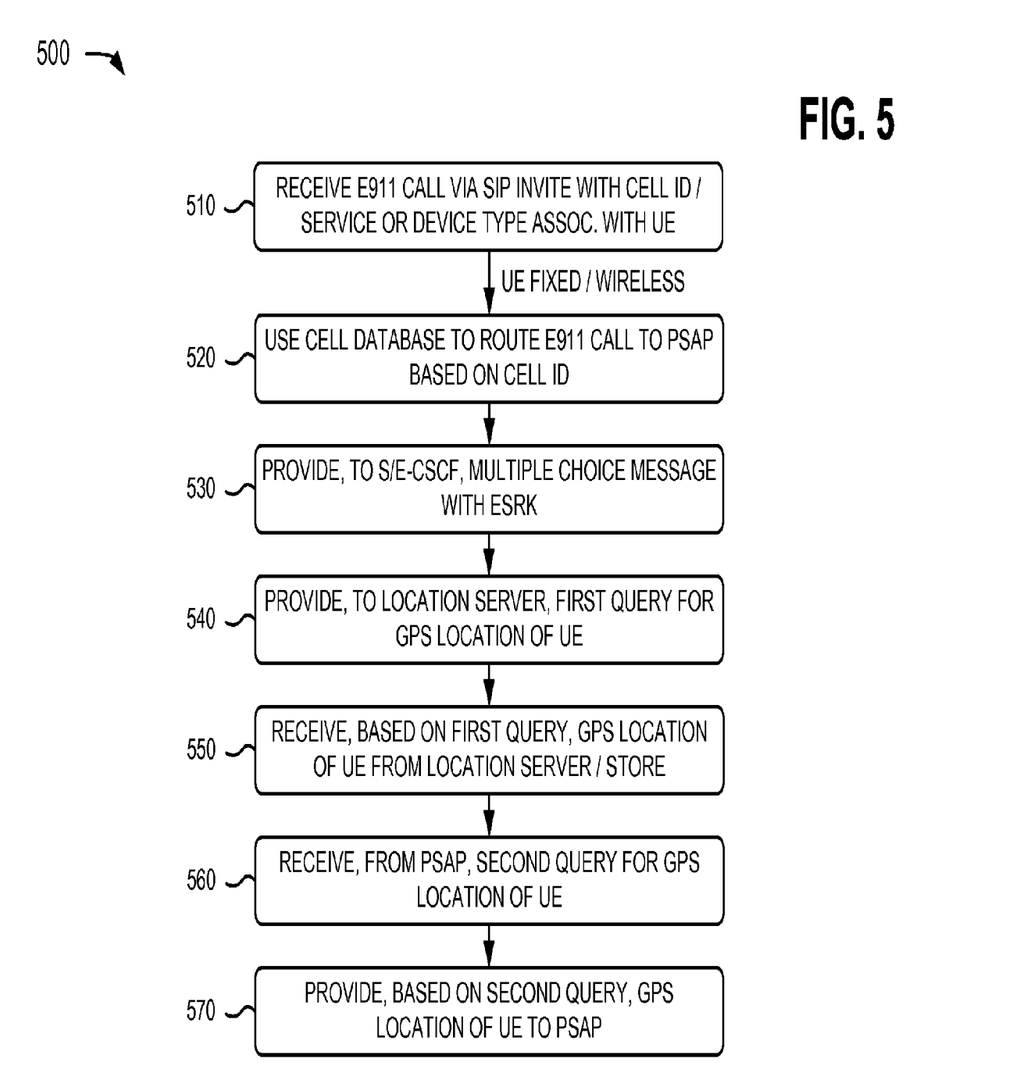
FIG. 5 is a flow chart of an example process for determining a location of a UE placing a VoIP-based E911 call according to an implementation described herein.

FIG. 5 is a flow chart of an example process 500 for determining a location of a UE placing a VoIP-based E911 call according to an implementation described herein. In one implementation, process 500 may be performed by ECS 135. In another implementation, some or all of process 500 may be performed by another device or group of devices, including or excluding ECS 135.

As shown in FIG. 5, process 500 may include receiving an E911 call via a SIP INVITE with a cell ID and/or a service/device type associated with a UE (block 510). For example, in an implementation described above in connection with FIG. 4, if a user of UE 105 makes an E911 call, UE 105 may generate SIP INVITE 410 (e.g., for the E911 call) that includes a cell ID and an indication of a service or device type associated with UE 105. UE 105 may provide SIP INVITE 410 to BS 110, and BS 110 may forward SIP INVITE 410 to PGW 120 via SGW 115. PGW 120 may provide SIP INVITE 410 to P-CSCF 115, and P-CSCF 115 may forward SIP INVITE 410 to S/E-CSCF 130. S/E-CSCF 130 may receive SIP INVITE 410, and may route the E911 call based the cell ID of UE 105 provided in SIP INVITE 410. For example, S/E-CSCF 130 may forward the E911 call (e.g., SIP INVITE 410) to ECS 135 based on the cell ID of UE 105. ECS 135 may receive, from S/E-CSCF 130, the E911 call via SIP INVITE 410.

As further shown in FIG. 5, if the UE is a fixed device or a wireless device, process 500 may include using a cell database to route the E911 call to the PSAP based on the cell ID (block 520). For example, in an implementation described above in connection with FIG. 4, if UE 105 is a fixed device or a wireless device, ECS 135 may use a cell database, such as a PSAP routing table (e.g., provided in ECS 135), to determine a PSAP (e.g., PSAP 140) to which to route the E911 call. For example, ECS 135 may compare the cell ID, provided in SIP INVITE 410, with the cell database to determine the PSAP to which to route the E911 call.

Returning to FIG. 5, process 500 may include providing, to a S/E-CSCF, a multiple choice message with an ESRK (block 530), providing, to a location server, a first query for a GPS location of the UE (block 540), and receiving/storing, based on the first query, the GPS location of the UE from the location server (block 550). For example, in an implementation described above in connection with FIG. 4, once the PSAP is determined, ECS 135 may allocate an ESRK (e.g., based on the determined PSAP) for S/E-CSCF 130 to use to route the E911 call to PSAP 140. The ESRK may also be used as a reference key by PSAP 140 to query ECS 135 for a GPS location of UE 105. ECS 135 may provide the ESRK in message 415 (e.g., a SIP "300" multiple choice message), and may provide message 415 to S/E-CSCF 130. ECS 135 may also provide, to location server 145, query 425 for a GPS location of UE 105. Query 425 may include a service/device type associated UE 105 as well as other parameters. Upon determining the GPS location of UE 105 (e.g., via reference number 430 or from the database), location server 145 may provide response 435 (e.g., in response to query 425) to ECS

135. Response 435 may include the GPS location of UE 105. ECS 135 may receive response 435 from location server 145, and may store the GPS location of UE 105 (e.g., contained in response 435) in a database associated with ECS 135.

As further shown in FIG. 5, process 500 may include receiving, from the PSAP, a second query for the GPS location of the UE (block 560), and providing, based on the second query, the GPS location of the UE to the PSAP (block 570). For example, in an implementation described above in connection with FIG. 4, upon receiving the E911 call from S/E-CSCF 130, as indicated by reference number 420, PSAP 140 may generate query 440 for the GPS location of UE 105 (e.g., using the ESRK as a query or reference key). PSAP 140 may provide query 440 to ECS 135, and ECS 135 may receive query 440. Based on query 440, ECS 135 may retrieve the GPS location of UE 105 from the database associated with ECS 135, and may generate response 445 that includes the GPS location of UE 105. ECS 135 may provide response 445 to PSAP 140. PSAP 140 may utilize the GPS location of UE 105, provided in response 445, in order to provide emergency services to UE 105.

Figure 6:
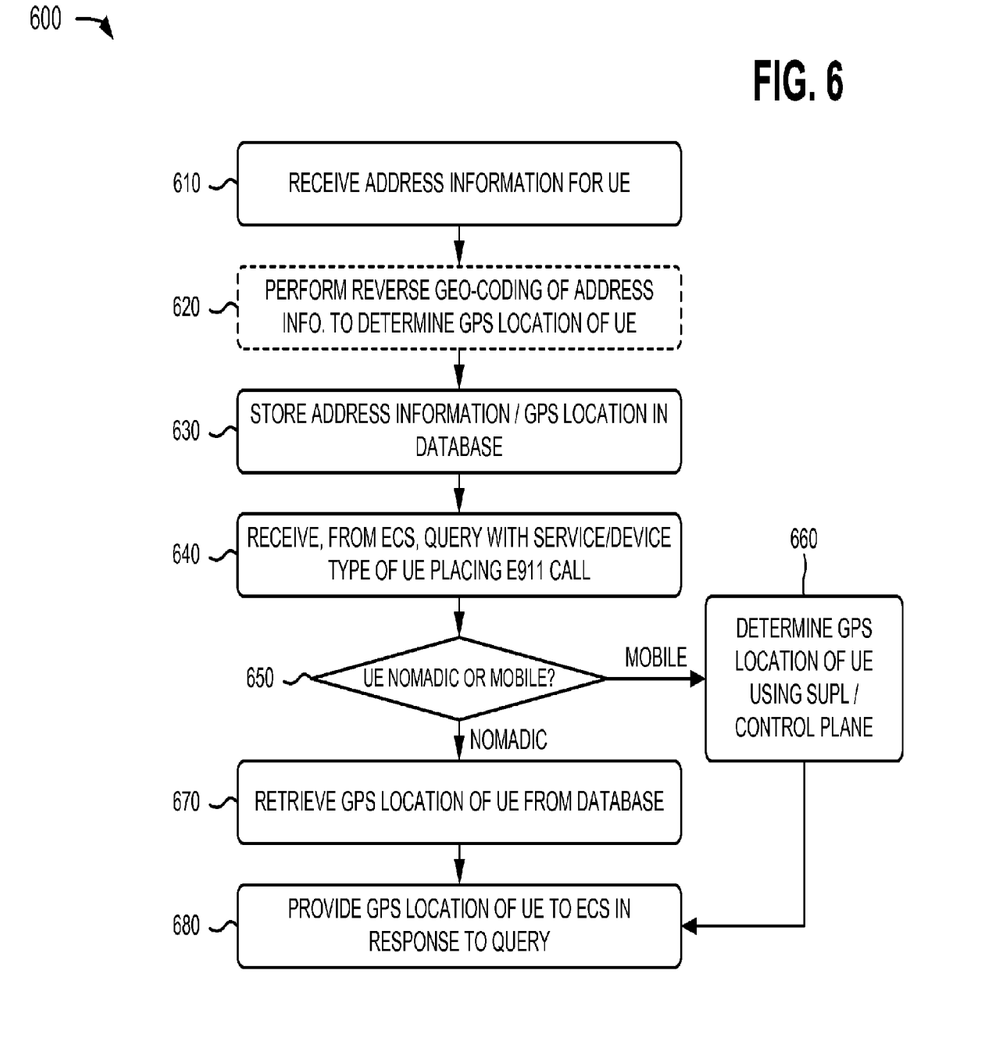
FIG. 6 is a flow chart of an example process for providing integrated VoIP-based E911 call support for mobile devices and nomadic devices according to an implementation described herein.

FIG. 6 is a flow chart of an example process 600 for providing integrated VoIP-based E911 call support for mobile devices and nomadic devices according to an implementation described herein. In one implementation, process 600 may be performed by location server 145. In another implementation, some or all of process 600 may be performed by another device or group of devices, including or excluding location server 145.

As shown in FIG. 6, process 600 may include receiving address information for a UE (block 610), and, if necessary, performing a reverse geo-coding of the address information to determine a GPS location of UE (block 620). For example, in an implementation described above in connection with FIG. 4, a user or service provider may provision address information, such as a civic address and/or a GPS location associated with UE 105, to network server 150, as indicated by reference number 405. In one example, the user or service provider may provision address information 405 to network server 150 by accessing network server 150 (e.g., via a login from an external device or via an internal mechanism) and providing address information 405 to network server 150. Network server 150 may provide address information 405 to location server 145. If only the civic address is provided via address information 405, location server 145 may perform reverse geo-coding to determine the GPS location from the civic address.

As further shown in FIG. 6, process 600 may include storing the address information and/or the GPS location in a database (block 630), and receiving, from an ECS, a query with a service/device type of the UE placing an E911 call (block 640). For example, in an implementation described above in connection with FIG. 4, network server 150 may provide address information 405 to location server 145, and location server 145 may store the civic address and/or the GPS location of UE 105 in a database associated with location server 145. If only the civic address is provided via address information 405, location server 145 may perform reverse geo-coding to determine the GPS location from the civic address. Location server 145 may store the determined GPS location in the database. ECS 135 may provide, to location server 145, query 425 for a GPS location of UE 105. Query 425 may include a service/device type associated UE 105 as well as other parameters. Location server 145 may receive query 425.

Returning to FIG. 6, process 600 may include determining whether the UE is a nomadic device or a mobile device (block 650). If the UE is a mobile device (block 650-MOBILE), process 600 may include determining the GPS location of the UE using a SUPL platform and/or a control plane solution (block 660). For example, in an implementation described above in connection with FIG. 4, location server 145 may receive query 425, and may determine whether UE 105 is a mobile device or a nomadic device based on the service/device type included in query 425. If UE 105 is a mobile device, location server 145 may begin a location session (e.g., based on query 425) to determine a GPS location of UE 105 by using, for example, a LPP session over the SUPL platform (or other similar platforms), as indicated by reference number 430. A control plane solution may be used to determine the GPS location of UE 105 in addition to or as an alternative to using the SUPL platform. In one example, location server 145 may provide, to PGW 120, a query for the GPS location of UE 105. PGW 120 may provide the query to SGW 125, and SGW 125 may provide the query to UE 105, via BS 110. UE 105 may return a response that includes the GPS location of UE 105, and the response (e.g., with the GPS location) may be provided to location server 145 via BS 110, SGW 125, and PGW 120.

As further shown in FIG. 6, if the UE is a nomadic device (block 650—NOMADIC), process 600 may include retrieving the GPS location of the UE from a database (block 670) and providing the GPS location of the UE to the ECS in response to the query (block 680). For example, in an implementation described above in connection with FIG. 4, if UE 105 is a nomadic device, location server 145 may retrieve the GPS location of UE 105 from the database associated with location server 145. As described above, the GPS location of UE 105 may be pre-provisioned in the database by UE 105 and network server 150, as indicated by reference number 405. Upon determining the GPS location of UE 105 (e.g., via reference number 430 or from the database), location server 145 may provide response 435 (e.g., in response to query 425) to ECS 135. Response 435 may include the GPS location of UE 105.

Systems and/or methods described herein may provide integrated VoIP-based emergency call (e.g., E911 calls) support for mobile devices and nomadic devices. In one example implementation, the systems and/or methods may utilize VoIP over a LTE network to support E911 calls, but may also support E911 calls over eHRPD networks or a mixture of LTE and eHRPD networks. The systems and/or methods may provide an integrated approach that uses the same routing, emergency call delivery, and UE location delivery design for both mobile devices and nomadic devices. The integrated approach may simplify network implementation and maintenance, and may permit devices to be used where valid civic addresses are not available.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device and from a user equipment (UE) placing an emergency call, address information associated with the UE;
   performing, by the computing device and when the address information fails to include a global positioning system (GPS) location of the UE, reverse geo-coding of the address information to determine the GPS location of the UE;
   storing, by the computing device, the address information and the GPS location of the UE in a database;
   receiving, from an emergency call server (ECS), a query that includes a service or device type associated with the UE;
   determining whether the UE is a mobile device or a nomadic device based on the service or device type;
   determining, when the UE is a mobile device, the GPS location of the UE using a secure user plane location (SUPL) platform; and
   retrieving, when the UE is a nomadic device, the GPS location of the UE from the database.

2. The method of claim 1, further comprising:
   providing the GPS location of the UE to the ECS in response to the query.

3. The method of claim 2, wherein the ECS provides the GPS location of the UE to a public safety answering point (PSAP) that receives the emergency call.

4. The method of claim 1, further comprising:
   determining, when the UE is a mobile device, the GPS location of the UE using a control plane solution in addition to the SUPL platform.

5. The method of claim 1, where the computing device comprises a location server device.

6. The method of claim 1, further comprising:
   receiving, from the ECS, a second query that includes a service or device type associated with a second UE;
   determining whether the second UE is a mobile device or a nomadic device; and
   forwarding, to a packet data network gateway and in response to determining that the second UE is a mobile device, a third query to identify the GPS location of the second UE.

7. The method of claim 1, wherein the receiving, by a computing device and from a UE placing an emergency call, address information associated with the UE comprises:
   receiving the address information from a wireless broadband device.

8. A computing device, comprising:
   a memory configured to store a plurality of instructions; and
   a processor configured to execute instructions in the memory to:
      receive, from a user equipment (UE) without global positioning system (GPS) functionality, address information associated with the UE placing an emergency call, wherein the address information includes at least a civic address of the UE,
      perform, when the address information fails to include a GPS location of the UE, reverse geo-coding of the address information to determine the GPS location of the UE,
      store the address information and the GPS location of the UE in a database,
      receive, from an emergency call server (ECS), a query that includes a service or device type associated with the UE,
      determine whether the UE is a mobile device or a nomadic device,
      determine, when the UE is a mobile device, the GPS location of the UE using a secure user plane location (SUPL) platform, and
      retrieve, when the UE is a nomadic device, the GPS location of the UE from the database.

9. The computing device of claim 8, wherein the processor is further configured to execute instructions in the memory to:
   provide the GPS location of the UE to the ECS in response to the query.

10. The computing device of claim 9, where the ECS provides the GPS location of the UE to a public safety answering point (PSAP) that receives the emergency call.

11. The computing device of claim 8, wherein the processor is further configured to execute instructions in the memory to:
    determine, when the UE is a mobile device, the GPS location of the UE using a control plane solution in addition to the SUPL platform.

12. The computing device of claim 8, wherein the computing device comprises a location server device.

13. The computing device of claim 8, wherein the processor is further configured to execute the instructions in the memory to:
    receive, from the ECS, a second query that includes a service or device type associated with a second UE;
    determine whether the second UE is a mobile device or a nomadic device; and
    forward, to a packet data network gateway and in response to determining that the second UE is a mobile device, a third query to identify the GPS location of the second UE.

14. A non-transitory computer-readable medium having stored thereon sequences of instructions which, when executed by at least one processor, cause the at least one processor to:
    receive, from a user equipment (UE) placing an emergency call, address information associated with the UE;
    perform, when the address information fails to include a global positioning system (GPS) location of the UE, reverse geo-coding of the address information to determine the GPS location of the UE;
    store the address information and the GPS location of the UE in a database;
    receive, from an emergency call server (ECS), a first query that includes a service or device type associated with the UE;

determine whether the UE is a mobile device or a nomadic device; and forward, to a packet data network gateway and in response to determining that the UE is a mobile device, a second query to identify the GPS location of the UE.

15. The non-transitory computer-readable medium of claim 14, further including instructions for causing the at least one processor to:

retrieve, in response to determining that the UE is a nomadic device, the GPS location of the UE from the database.

16. The non-transitory computer-readable medium of claim 14, further including instructions for causing the at least one processor to:

provide the GPS location of the UE to the ECS in response to the first query.

17. The non-transitory computer-readable medium of claim 14, further including instructions for causing the at least one processor to:

receive, from the ECS, a second query that includes a service or device type associated with a second UE;

determine whether the second UE is a mobile device or a nomadic device; and determine, in response to determining that the second UE is a mobile device, the GPS location of the second UE using a secure user plane location (SUPL) platform and a control plane solution.

18. The non-transitory computer-readable medium of claim 17, wherein when determining the GPS location of the second UE using a control plane solution, the instructions cause the at least one processor to:

query a mobility management entity.

19. The non-transitory computer-readable medium of claim 14, wherein when determining whether the UE is a mobile device or a nomadic device, the instructions cause the at least one processor to:

identify whether the UE is a mobile device or a nomadic device based on the service or device type included in the first query.

20. The non-transitory computer-readable medium of claim 14, further including instructions for causing the at least one processor to:

receive, from the packet data network gateway, the GPS location of the UE; and provide, in response to the first query, the GPS location of the UE to the ECS.

* * * * *